United States Patent
Yang et al.

(10) Patent No.: US 8,205,116 B2
(45) Date of Patent: Jun. 19, 2012

(54) COMMON CHRONICS RESOLUTION MANAGEMENT

(75) Inventors: Chen-Yui Yang, Marlsboro, NJ (US); Paritosh Bajpay, Edison, NJ (US); Monowar Hossain, Middletown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 347 days.

(21) Appl. No.: 12/388,093

(22) Filed: Feb. 18, 2009

(65) Prior Publication Data

US 2010/0211817 A1    Aug. 19, 2010

(51) Int. Cl.
*G06F 11/30* (2006.01)
(52) U.S. Cl. ............................. 714/26; 714/4.1
(58) Field of Classification Search ............... 714/4, 4.1, 714/26
See application file for complete search history.

(56) References Cited

U.S. PATENT DOCUMENTS

| | | | |
|---|---|---|---|
| 5,724,263 A * | 3/1998 | Raguram et al. | 702/84 |
| 7,231,182 B2 * | 6/2007 | Katz | 455/67.11 |
| 2002/0083169 A1 * | 6/2002 | Aki et al. | 709/224 |
| 2002/0143917 A1 * | 10/2002 | Stevenson et al. | 709/223 |
| 2002/0161877 A1 * | 10/2002 | Stevenson et al. | 709/223 |
| 2003/0172152 A1 * | 9/2003 | Vaver | 709/224 |
| 2003/0229693 A1 * | 12/2003 | Mahlik et al. | 709/224 |
| 2004/0023655 A1 * | 2/2004 | Hoy et al. | 455/445 |
| 2006/0064486 A1 * | 3/2006 | Baron et al. | 709/224 |
| 2006/0085696 A1 * | 4/2006 | Bauer et al. | 714/47 |
| 2006/0176824 A1 * | 8/2006 | Laver et al. | 370/241 |
| 2007/0022313 A1 * | 1/2007 | Mackey et al. | 714/4 |
| 2007/0250723 A1 * | 10/2007 | Shima et al. | 713/300 |
| 2008/0024949 A1 * | 1/2008 | Kulkarni et al. | 361/111 |
| 2008/0155346 A1 * | 6/2008 | Britt et al. | 714/43 |
| 2008/0195614 A1 * | 8/2008 | Lutz et al. | 707/7 |
| 2008/0313118 A1 * | 12/2008 | Anerousis et al. | 706/46 |
| 2009/0099818 A1 * | 4/2009 | Kadaba | 702/184 |
| 2009/0158096 A1 * | 6/2009 | Ali et al. | 714/43 |

* cited by examiner

*Primary Examiner* — Scott Baderman
*Assistant Examiner* — Chae Ko
(74) *Attorney, Agent, or Firm* — Hanley, Flight & Zimmerman, LLC (57) ABSTRACT

Systems and methods for managing problems that are determined to be chronic problems with network devices or circuits are disclosed. The systems and methods receive data indicating a problem with a network device or circuit and determine based on the data a first action to be performed on the network device or circuit. Upon determining that a recurring problem exists for the network device or circuit, a rule set is used to determine if the data indicates a chronic problem. Upon determining that a chronic problem exists for the network device or circuit, the rule set is used to determine a monitoring period for the network device or circuit. Further, within the monitoring period a performance indicator that indicates that the network equipment or circuit is performing acceptably or unacceptably is used to determine further actions for the network device or circuit.

14 Claims, 6 Drawing Sheets

COMMON CHRONICS RESOLUTION MANAGEMENT

FIELD

This application relates generally to telecommunications networks, and more particularly, detecting, managing and resolving chronic problems in telecommunications networks.

BACKGROUND

Telecommunications services are utilized with almost every home and business in the country. These homes and business rely on telecommunications services to provide voice, data, video and other services to their home and business. Unfortunately, no system is perfect and degradation or service failure occasionally happens. Telecommunications providers attempt to resolve such issues on the first indication of trouble and many times the issue is in fact resolved.

Unfortunately, there are occasions where there are intermittent problems or no root cause of the problem can be found. In these situations, a customer may experience multiple instances of service degradation or failure, and such instances may occur after the customer has been told the problem was fixed. This leads to increased customer frustration and dissatisfaction with the service provider. Additionally, a many hours of testing are typically spent on testing, which is very costly to the telecommunications provider and frustrating to the customer. Testing work may be allocated to different work centers as each work center attempts to find the problem and fix it. These additional tests can result in many hours of manual testing, and if the problem is not quickly corrected, service level agreements can be exceeded causing the telecommunications provider to provide refunds to the customer.

BRIEF DESCRIPTION OF THE DRAWINGS

Various embodiments are described in detail in the discussion below and with reference to the following drawings.

DETAILED DESCRIPTION

The various embodiments include systems and methods for detecting and analyzing discontinuities in a communications link. Specific details of several embodiments are set forth in the following description and in FIGS. 1 through 6 to provide an understanding of such embodiments. One of ordinary skill in the art, however, will understand that additional embodiments are possible, and that many embodiments may be practiced without several of the details disclosed in the following description.

Figure 1:
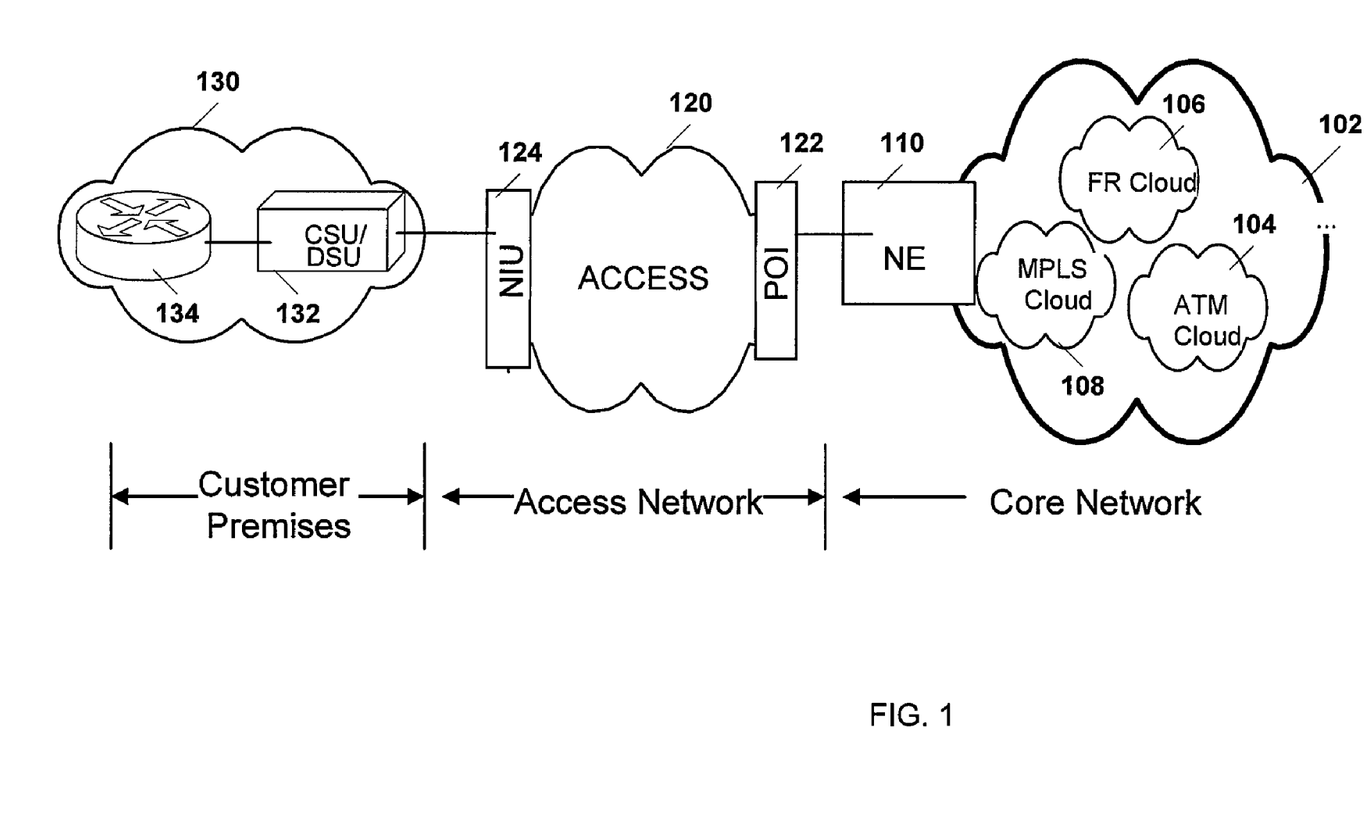
FIG. 1 is a diagrammatic block view illustrating an example telecommunications network used in embodiments of the invention.

FIG. 1 is a diagrammatic block view illustrating an example telecommunications network 100 used in embodiments of the invention. In the example shown, telecommunications network may be generally divided into three network segments, a core network 102, an access network 120, and a customer premises network 130. In general, core network 120 includes any of a variety of network technologies that provide backbone networks that carry large volumes of voice, data and video across long distances. The core network may be implemented using a Frame Relay (FR) network 106, an Asynchronous Transfer Mode (ATM) network 104, a Multi-protocol Label Switching (MPLS) network 106, or any of a variety of other network technologies and protocols now known or developed in the future. A core network may be operated and managed by an Inter-Exchange Carrier (IXC) or a wireless carrier.

Access network 120 provides a communications path for devices on customer premises network 130 to access the telecommunications resources provided by core network 102. In general, access network carries voice, data or video over copper or fiber-optic communications lines between core network 102 and customer premises network 130. An access network 102 may be operated and managed by a Local Exchange Carrier (LEC).

Customer premises network 130 includes networks that are managed at a customer's premises by or on behalf of a customer.

Each of the networks 102, 120 and 130 include various network devices (including cables and circuits) that communicate with one another to provide for the transfer of voice, data and/or video through the network. For example, network element 110 is a device that communicates with POI (Point of Interface) equipment 122 to provide an interface between access network 120 and core network 102. Similarly, NIU (Network Interface Unit) equipment 124 provides an interface between a customer network 130 and access network 120. NIU 124 may be coupled to a CSU/DSU (Channel Service Unit/Data Service Unit) at a customer premises. Customer network 130 may include various devices 134 such as routers, switches, and bridges that provide network connectivity within a customer premises.

One issue with previous systems is that they do not provide a complete end-to-end or total service view of the problem. Previous systems are typically limited to a particular segment of the system, that is, the customer premises, access, or core network segments of the network. Even if each segment is managed by one company, the current system and service views provided by the system are limited to the network segment managed by a particular operational group, leading to the problem that each operational group only has a partial view of the end-to-end service. For example, a managed services group may manage customer premises equipment and receive a network layer 1 view of customer premises equipment and a network layers 2-3 view of router or interface status and configuration. An access provider may receive a network layer 1 view from the network interface 124 to point of interface 122, and no view of network layers 2-3. A core network provider, (e.g., an interexchange carrier) responsible for a core network may receive data providing a view from the point of interface 122 to the network edge or other point of interface, and a network layers 2-3 view of network edge device/interface status and configuration. However, none of the groups or systems receives data providing a total view of the system.

FIG. 1 has provided an example of various networks and network devices that may be used in providing telecommunications services to a customer. It should be noted that devices, networks and configurations in addition to those described in the example above are possible and within the scope of the inventive subject matter.

Figure 2:
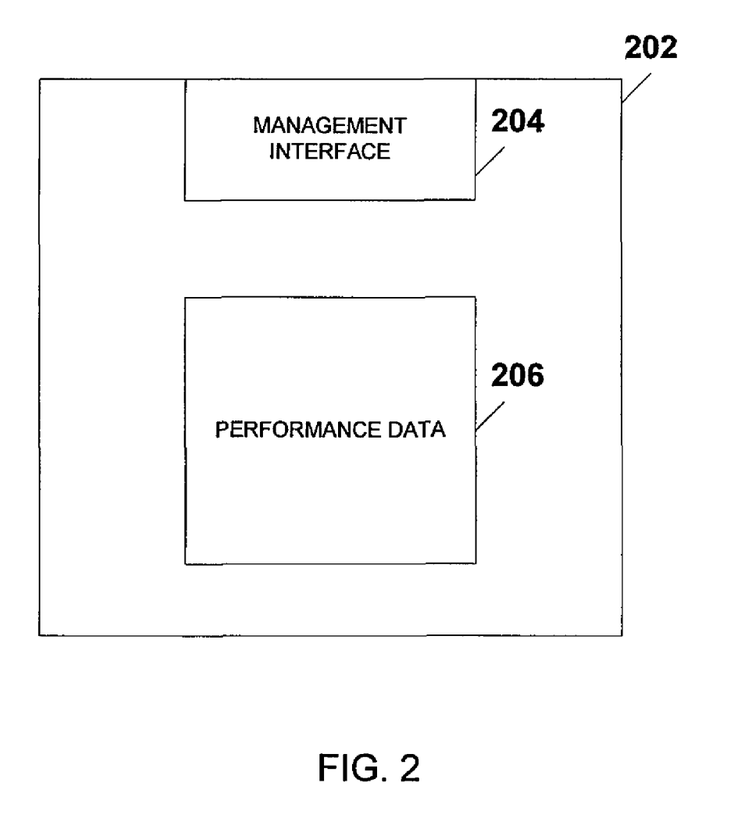
FIG. 2 is a diagrammatic block view providing further details of a network device used in a telecommunication network.

FIG. 2 is a diagrammatic block view providing further details of a network device 202 used in telecommunications networks such as networks 102, 120 and 130 described above. The details provided in FIG. 2 may apply to any device on a network, including devices 134, CSU/DSU 132, NIU 124, POI 122 and NE 110. In addition to any communications interfaces provided by network device 202, a management interface 204 may be provided. Management interface 204 provides an interface to remotely configure and control a network device, and provides an interface to obtain performance data 206 about the operation of the network device 202. In some embodiments, management interface 204 is an SNMP (Simple Network Management Protocol) interface and performance data 206 is maintained in a MIB (Management Information Block).

Performance data 204 can include data regarding the amount of voice, data or video handled by the device and data regarding communications rates achieved by the device. Additionally, performance data 204 may include a log of errors and/or performance degradations that occurred on the device or were detected by the device.

Examples of various problems and errors that may occur are as follows:

Controlled Slip (CS) Error Event

A Controlled Slip is the replication or deletion of the payload bits of a digital signal level 1 (DS1) frame. A Controlled Slip may be performed when there is a difference between the timing of a synchronous receiving terminal and the received signal. A Controlled Slip does not cause an Out of Frame defect.

Line Coding Violation (LCV) Error Event

An LCV is the occurrence of either a Bipolar Violation or Excessive Zeroes error event.

Path Coding Violation (PCV) Error Event

A PCV error event is a frame synchronization bit error in the D4 and E1-no cyclic redundancy check (CRC) formats, or a CRC error in the Extended Super Frame (ESF) and E1-CRC formats.

Bursty Errored Seconds (BES)

A Bursty Errored Second (also known as Errored Second type B) is a second with fewer than 320 and more than one Path Coding Violation error events, no Severely Errored Frame defects and no detected incoming AIS defects. Controlled slips are not included in this parameter. This is not incremented during an Unavailable Second.

Controlled Slip Seconds (CSS)

A Controlled Slip Second is a one second interval containing one or more controlled slips.

Degraded Minutes

A Degraded Minute is one in which the estimated error rate exceeds 1E-6 but does not exceed 1E-3. Degraded Minutes are determined by collecting all of the Available Seconds, removing any Severely Errored Seconds grouping the result in 60-second long groups and counting a 60-second long group (minute) as degraded if the cumulative errors during the seconds present in the group exceed 1E-6. Available seconds are merely those seconds which are not unavailable as described below.

Errored Seconds (ES)

For ESF and E1-CRC links an Errored Second is a second with one of the following:

one or more Path Code Violations
one or more Out of Frame defects
one or more Controlled Slip events
a detected AIS defect
Line Errored Seconds (LES)

A Line Errored Second, according to T1M1.3, is a second in which one or more Line Code Violation error events were detected. Line Errored Seconds may be counted at both ends.

Severely Errored Framing Second (SEFS)

A Severely Errored Framing Second is a second with either one or more OOF defects or a detected AIS defect.

Severely Errored Seconds (SES)

A Severely Errored Second for ESF signals is a second with one of the following:

320 or more Path Code Violation Error Events
one or more OOF defects
a detected AIS defect For E1-CRC signals, a Severely Errored Second is a second with either 832 or more Path Code Violation error events or one or more OOF defects. For E1-noCRC signals, a Severely Errored Second is a 2048 LCVs or more. For D4 signals, a Severely Errored Second is a count of one second intervals with Framing Error events, or an OOF defect, or 1544 LCVs or more.

Controlled slips are not included in this parameter. This is not incremented during an Unavailable Second.

Unavailable Seconds (UAS)

Unavailable Seconds are calculated by counting the number of seconds that the interface is unavailable. The DS1 interface is said to be unavailable from the onset of ten contiguous SESs, or the onset of the condition leading to a failure (see Failure States). If the condition leading to the failure was immediately preceded by one or more contiguous SESs, then the DS1 interface unavailability starts from the onset of these SESs. Once unavailable, and if no failure is present, the DS1 interface becomes available at the onset of ten contiguous seconds with no SESs. Once unavailable, and if a failure is present, the DS1 interface becomes available at the onset of 10 contiguous seconds with no SESs, if the failure clearing time is less than or equal to ten seconds. If the failure clearing time is more than ten seconds, the DS1 interface becomes available at the onset of ten contiguous seconds with no SESs, or the onset period leading to the successful clearing condition, whichever occurs later. With respect to the DS1 error counts, all counters are incremented while the DS1 interface is deemed available. While the interface is deemed unavailable, the only count that is incremented is UASs. A special case exists when the ten or more second period crosses the 900 second statistics window boundary, as the foregoing description implies that the Severely Errored Second and Unavailable Second counters are adjusted when the Unavailable Signal State is entered. Successive "gets" of the affected dsx1IntervalSESs and dsx1IntervalUASs objects will return differing values if the first get occurs during the first few seconds of the window.

Various problems may occur in the operation of the telecommunications network 100. These problems include both degradation of service (i.e., the quality or throughput of the system is reduced below acceptable or contracted rates) and persistent or intermittent failures. When a problem occurs, a trouble ticket is typically opened by a service provider in order to document the problem and activities associated with resolving the problem.

Figure 3:
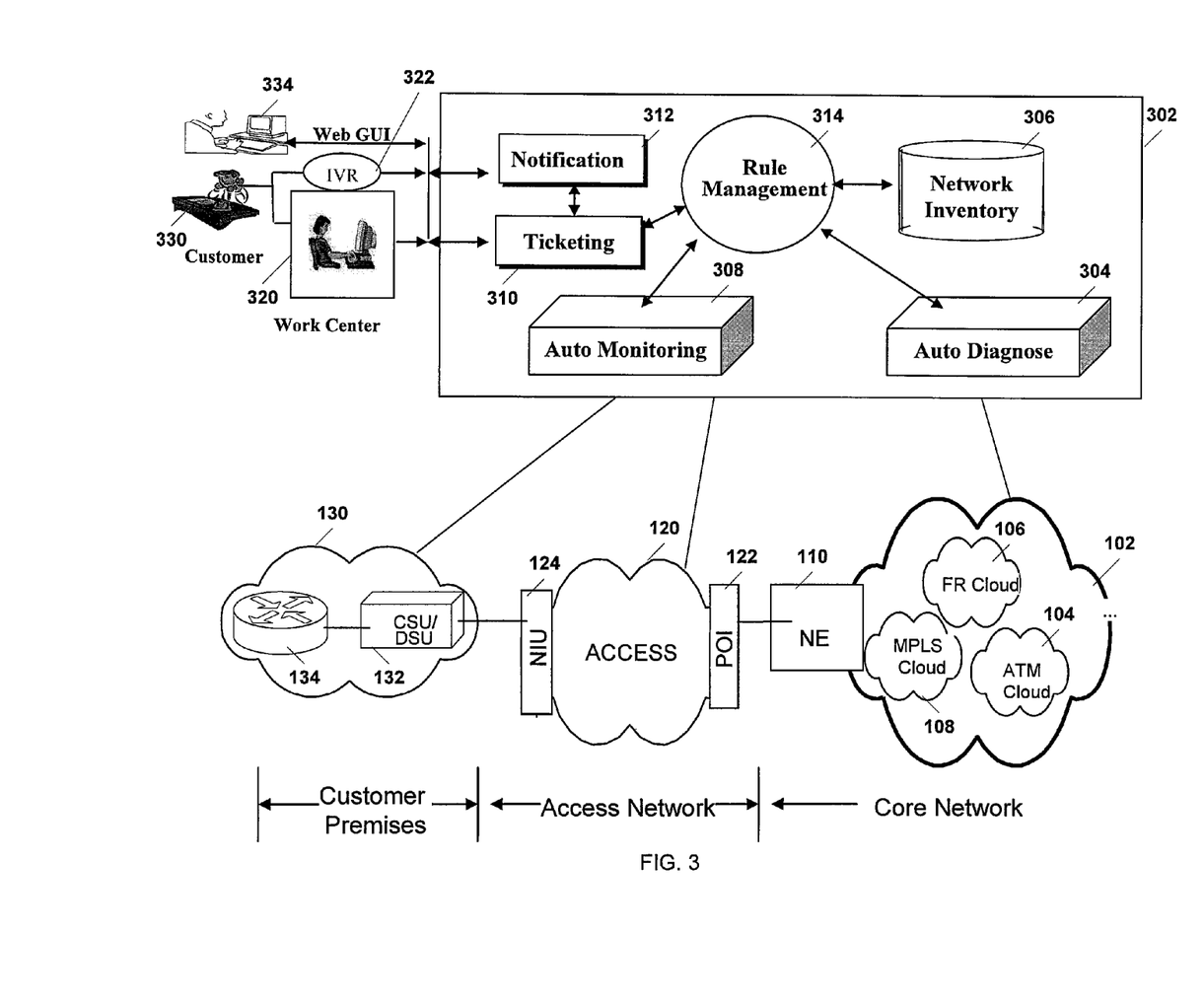
FIG. 3 is a diagrammatic block view of a telecommunications management system according to embodiments of the invention.

FIG. 3 is a diagrammatic block view of a telecommunications management system 302 according to embodiments of the invention. System 302 includes modules for managing chronic problems in a telecommunications environment 300.

In some embodiments, telecommunications management system 302 includes auto-diagnose module 304, auto-monitor module 308, ticketing module 310, notification module 312, rule management module 314 and network inventory database 306.

Ticketing module 310 manages trouble tickets for system 302. As noted above, a trouble ticket is typically opened when a problem is detected in a network. The trouble ticket includes data describing the type of problem or trouble with a circuit and efforts made to resolve the problem. Trouble tickets may be opened in various ways. A customer may open a trouble ticket. For example a customer may open a trouble ticked by calling into a telecommunications provider work center 320. A person receiving the call may use the ticketing module to open a trouble ticket on behalf of the customer. Alternatively, a customer may use a web based graphical user interface 334 to open a trouble ticket that is sent to ticketing module 310. Further, an Interactive Voice Response (IVR) system 322 may be used to open a trouble ticket in ticketing module 310. It should be noted that the trouble ticket typically contains trouble code data that describes the problem, it does not typically identify the actual root cause of the problem.

In some embodiments, the auto-diagnose module 304 may automatically open a trouble ticket in accordance with data obtained from various devices and circuits 102-130 and rules obtained from rule management module 314.

Notification module 312 provides notification to various parties that a trouble ticket has been opened. For example, notification module 312 may provide notification to telecommunications provider employees at a work center 320 so that technicians may be dispatched to resolve the problem. Further, notification module may provide notification to a customer that a trouble ticket has been opened on its behalf. This is useful when a trouble ticket has been automatically opened, for example by auto-diagnose module 304, without the intervention of the customer. Notification module 312 may use a variety of ways to provide notification. Examples include email, Web GUI 334, IVR 322, pagers, text messages or any other notification mechanism known in the art or developed in the future.

Technicians that are sent to resolve the problem attempt to determine the equipment or circuit exhibiting the problem and provide a solution. The technician may use ticketing module 310 to update the trouble ticket to indicate how the technician dealt with the reported problem. In many cases, the problem is resolved and no further action may be required. However, in a significant number of cases, the technician may not be able to determine where the problem lies because the problem is not occurring when the technician is available to diagnose the problem, or the problem may go away on its own while the technician is attempting to diagnose the problem. In these cases, the trouble ticket may updated with a "Test OK" or "Came Clear" resolution code. Test OK problems include those problems where a problem was logged or ticketed, but a subsequent test of the problem indicated that the equipment was determined to be operating properly. It should be noted that this does not mean the equipment is in fact operating properly. There may be intermittent problems with the equipment, or there may be problems with the equipment that are not revealed by the diagnostics applied to the equipment. "Came Clear" problems include those problems where the problem was observed, but then disappeared before any root cause could be diagnosed. Other problems include problems that did not fit into one of the above categories.

In addition, the technician may update the trouble ticket to indicate where a problem was found or suspected. For example, the problem may lie with customer premises equipment or with an access provider. The customer premises equipment category includes those problems where the root cause of the problem was in equipment at the customer's premises. Access provider problems include those problems in which the root cause of the problem was in equipment at an access network provider.

The updates to the trouble ticket may not indicate the root cause of the problem, rather, the trouble ticket indicates what the technician found and did to resolve the problem. In many cases, the condition, equipment or circuit causing the problem is correctly determined and the problem is resolved. However, in a significant number of cases, the problem recurs, either because the problem was not correctly diagnosed in the first instance, or because the condition, equipment or circuit causing the problem could not be determined. A telecommunications circuit which exhibits recurring problems may be referred to as a "chronic" circuit.

Rule management module 314 maintains and manages a set of rules for handling problems in a telecommunications environment 300. The rules include rules for determining that a circuit is having chronic problems, rules for diagnosing the cause of chronic problems and rules for monitoring a circuit that has had chronic problems. The rules may be established in a variety of ways. For example, statistical analysis may be applied to data received regarding past problems, their attempted resolutions and codes associated with the attempted resolutions, and their ultimate resolution to determine a statistical model. The statistical model may be transformed into rules for diagnosing and monitoring problems that may turn into chronic problems if not addressed properly. The statistical model may vary depending on the type of circuits involved. For example, different statistical models may be used depending on whether the circuit is a voice, data or video circuit.

Rules management module may use one or more indicators or attributes as part of the rule evaluation of whether a trouble or problem is classified as chronic and what treatment the trouble or problem will receive. In some embodiments, a chronic indicator is used to determine if the problem may be classified as chronic. The chronic indicator in some embodiments uses data and rules to determine if the problem should be classified as a chronic problem. For example, the trouble code data, data indicating who reported the data (e.g., customer report or auto-detected trouble) and the number of recurrences over a time period may be used to determine if the problem is chronic. For example, a first group of trouble codes may be considered chronic if they are reported three or more times for the same circuit in a twenty-four hour period. A second group of trouble codes may be considered chronic if they are reported three or more times for the same circuit within a week. Other trouble codes may be considered chronic if they are reported for the same circuit three or more times for the same circuit within a month. Those of skill in the art will appreciate that other trouble frequencies are possible and within the scope of the inventive subject matter.

Additionally, a chronic type indicator may be used to determine if further monitoring is required. In some embodiments, the chronic type indicator is used to determine whether monitoring is required and the type of monitoring that will be applied. For example, a resolution code of "Tested OK" or "Came Clear" may indicate that further monitoring is required. Additionally, the chronic type indicator may be based on whether the problem was initially reported by the customer or whether the problem was auto-detected based on alarms or other data received by the system. For example, a trouble ticket that was initially reported by a customer and then "Tested OK" or "Came Clear" may be classified as chronic if further intermittently occurring and automatically detected alarms indicate intermittent trouble with the circuit.

Further, a continued performance indicator may be used to determine if the circuit performance is stable, improving, or degrading after a trouble is classified as chronic. The continued performance indicator may be determined based on data collected from devices associated with the circuit identified as having a chronic trouble. In some embodiments, data may be collected at periodic intervals (e.g., every 60 minutes) and used to determine whether the circuit performance is stable, improving, or degrading.

Auto-diagnose module 304 performs automated diagnosis of problems with equipment in a telecommunications environment 300. In order to perform automated diagnosis, the auto-diagnose module may receive trouble ticket data and data from network devices in any or all of networks 102, 120 and 130. In some embodiments, auto-diagnose module receives performance and error data using an SNMP interface. Auto-diagnose module can use rules from rules management module 314 in combination with data received from network devices in order to provide a diagnosis of a problem in the telecommunications system and attempt to find the root cause of the problem. In some embodiments, auto-diagnose module 304 receives data from multiple network devices on multiple network segments. This data can be used with patterns and correlations identified in historical data regarding resolution codes for past trouble tickets in order to accurately determine or predict a root cause for a problem with a circuit. An appropriate course of action may then be determined and sent to the work center for further action.

Auto-monitoring module 308 monitors network devices. For example, rules in rule management module 314 may determine that one or more network devices should be automatically monitored to determine if a chronic problem has in fact been resolved. Auto-monitoring module 308 may use management interfaces on the relevant network devices to obtain information regarding the performance of the device. In some embodiments, an SNMP interface is used.

As illustrated in FIG. 3, system 302 receives data from devices in the core network, access network, and customer premises network. This data can be both proprietary data, and non-proprietary data. For example, in cases where the access network or customer premises network is managed by a different company from the core network, non-proprietary data may be obtained from the different companies. This data can include layer 1 layout and status information such as current and historical alarms and PM (Performance Monitoring) data, layer 2-3 configuration and status (e.g. LMI status, results of interface commands), and trouble report status and history.

Thus as shown in FIG. 3, the system can provide an end-to-end total service view. This is desirable because it can eliminate blind spots in a groups view of the service. Further, a consistent view of the service can be provided to system operators. The end-to-end total service view can provide improved ease and speed of trouble isolation and trouble resolution. Additionally, more detailed and accurate information can be provided to the customer.

Network inventory 306 is a database of network components such as network devices and configurations, circuits and circuit configurations etc. that may be used by rule management module 314 and other modules in system 302. For example, auto-diagnose module and auto-monitor module may use network inventory 306 to determine if network devices have management interfaces that may be used to obtain performance data.

Further details on the operation of system 302 are provided below with reference to FIG. 4.

Figure 4:
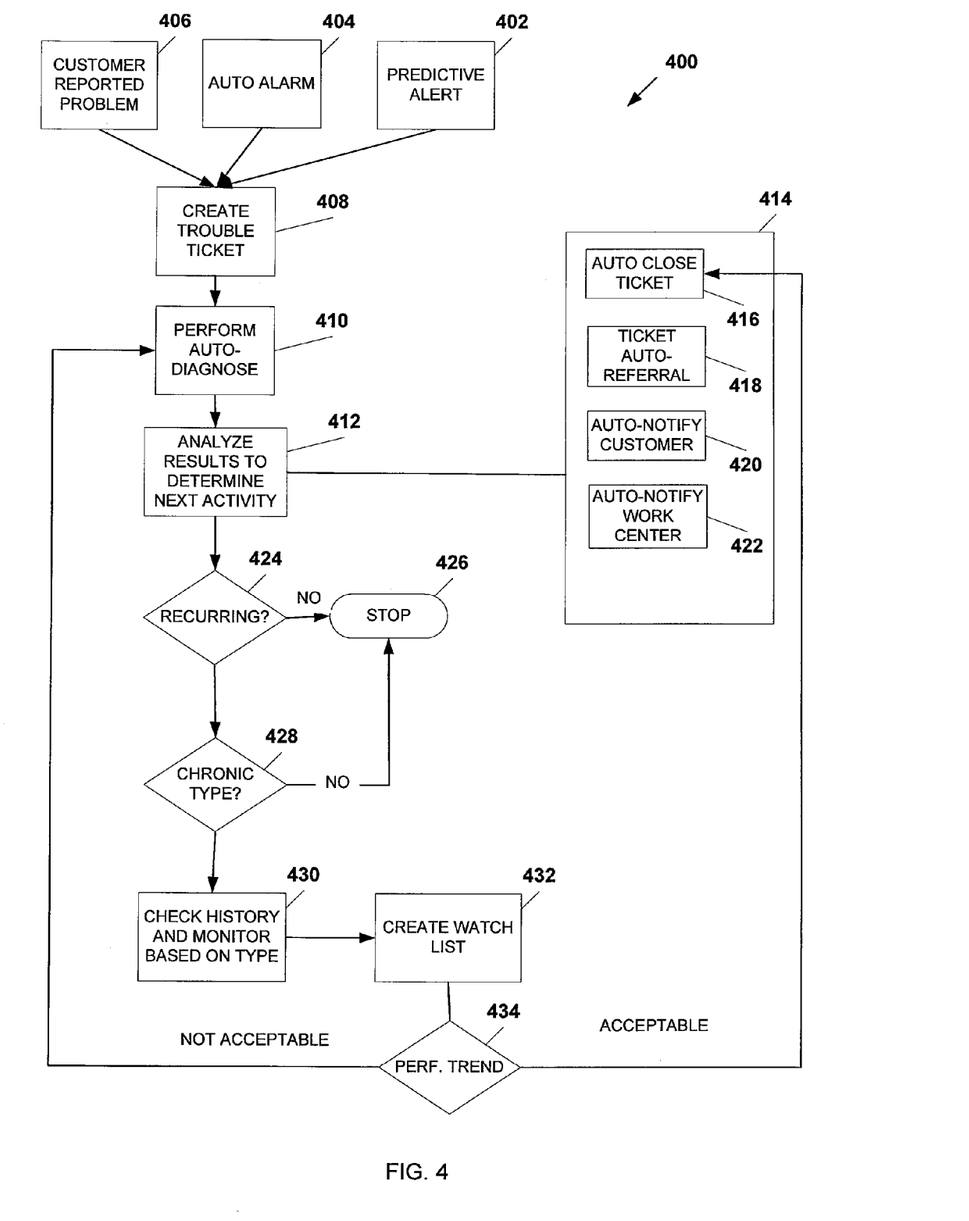
FIG. 4 is a flowchart of a method for managing chronic telecommunications problems according to embodiments of the invention.

FIG. 4 is a flowchart of a method for managing chronic telecommunications problems according to embodiments of the invention. The method begins by receiving data indicating a problem. The data may be generated by a predictive alert system (block 402) that analyzes data from various network components to predict that a problem is about to occur in a network component. Alternatively, the data may be an auto-alarm (block 404), generated by network components that detected a fault. Further, the data may be received through a report provided by a customer (block 406). At block 408, the data is sent to ticketing module 310 and a trouble ticket is opened.

At block 410, the auto-diagnose module receives the trouble ticket data and uses the data, along with rules from rule management module 314 to provide a diagnosis of the root cause of the problem. The auto-diagnose module may obtain other data (i.e. from network components) in order to diagnose the problem.

At block 412, the results of the automatic diagnosis are analyzed to determine the next action to be taken at block 414. The rules maintained by rule management module 314 are used to determine the next action. Various actions may be taken at block 414 depending on the rules. For example, the ticket may be automatically closed at block 416 if the rules determine no problem exists. Alternatively, the rules may indicate that the ticket is to be referred to technician or dispatch center at block 418. Further, at block 420 the rules may indicate that a notification should be provided to the customer. Similarly, at block 422 the rules may indicate that a work center should be notified that the ticket has been opened. Other actions may be determined according to the rules and such actions are within the scope of the inventive subject matter. Further, it should be noted that the rules may indicate that more than one action may be initiated.

After the appropriate action has been completed at block 414, the method proceeds to block 424 where the system determines if the circuit involved with the trouble report is exhibiting recurring problem. In some embodiments, the rules maintained by rule management system and trouble ticket data are used to determine if a circuit is exhibiting a recurring problem. As an example, a circuit may be considered to have recurring problems if it has "x" problems (trouble tickets) within a "y" day period. For example, three problems or trouble tickets within a thirty day period may indicate a recurring problem. In some embodiments, the number of problems or the period may vary depending on the trouble code or other data in the trouble ticket. Other rules may be used instead of or in addition to the above in order to determine that a circuit is having recurring problems. If the rules determine that the problem is not part of a recurring problem for the circuit, the method stops at block 426.

If the problem is determined to be with a circuit having recurring problems, then at block 428, the system uses rules and trouble ticket data to determine if the current problem is a type that is associated with chronic problems. In some embodiments, a chronic type indicator is set based on the determination. It is possible that a problem may be recurring, but is not necessarily part of a chronic problem with a circuit. In some embodiments, the system determines an indicator of whether the problem is a potential chronic problems with high probability to repeat based on analysis and correlation of resolution codes into categories. As an example, one indicator of a potential chronic problem is when a resolution code indicating a hard down was provided and a failed circuit or equipment was fixed. A second example of an indicator of a potential chronic problem is when a resolution codes such as NTF (No Trouble Found), TOK (Test OK) or Alarm Came Clear is provided indicates that no fix was provided to a circuit or equipment. This may be indicative of unstable equipments or circuits. Other data and resolution codes may be used to determine if a problem is a potential chronic problem. If the problem is determined to be not a chronic problem, then the method stops at block 426.

If the problem is part of a recurring set of problems and the problem type is potentially a chronic problem, the system checks the circuit history and based on the history and the problem type, uses rules to determine a monitoring period. In some embodiments, the history logs and current problem data are used by rules to provide two categories each with a different monitoring period. A first category is used for problems in which the resolution codes indicate that failed equipment or a failed circuit was fixed. These are referred to as "hard down" problems. In this case, a monitoring period of relatively short monitoring period may be established for monitoring the relevant equipment and/or circuits. For example, a monitoring period of seven days may be established. A second category may be used for problems that are indicative of an unstable circuit or equipment. Examples include problems where the resolution code was "Tested OK", "Came Clear" or "No Trouble Found". In this case, a relatively longer monitoring period may be established, for example, thirty days. The above rules are examples for particular embodiments. Alternative embodiments may have other rules used to determine other categories and monitoring periods based on the input data.

At block 432, a watch list entry is created for the circuit and/or equipment. The watch list entry identifies the equipment and/or circuit and the monitoring period determined at block 430.

At decision block 434, a decision is made regarding the performance of the equipment and/or circuits on the watch list. The decision may be driven by rules in rule management system 314. If the rules indicate that the equipment or circuit is performing acceptably, then the method may proceed to block 414 to automatically close the trouble ticket. However, if rules determine that the equipment or circuit is not performing in an acceptable manner, than the system may return to block 410 to perform another diagnosis of the problem, using any data that has been obtained since the problem was initially reported. A performance indicator may be used by the rules to determine performance. For example, a formula to calculate circuit performance may be as follows: Minutes with service degradation (errored seconds, severely errored seconds, unavailable seconds), divided by total measured minutes. Many equipment vendors provide 15 minutes of performance data. Thus during the 15-minute interval, if a circuit or equipment experiences 3 minutes degradation (for any of the reasons listed above), the degradation would be 20% (i.e., (3/15)×100%). The factors used in the determination of service degradation, i.e., errored seconds, severely errored seconds, unavailable seconds etc. may include the error conditions provided in detail above. The above formula may be used to determine circuit performance and the result of the application of the formula may be stored and use to compare with previous results to determine circuit performance trends. It should be noted that the formula provided above is but one possible formula that may be used to determine performance. Other formulas may be used to determine circuit performance and are within the scope of the inventive subject matter.

Further, various rules may be used to determine acceptable and unacceptable performance, and the rules may vary based on equipment, circuit type, and circuit use (voice, data, video etc.). For example, acceptable performance may be indicated if the circuit performance has not degraded, improved, or not degraded beyond a certain percentage. Unacceptable performance may be indicated if the circuit performance has degraded past the certain percentage. For example, for some embodiments, a degradation of less than 5% may be considered acceptable while 5% or more is unacceptable. Other embodiments may use more strict consideration, e.g. a degradation of more than 1% may be considered unacceptable. Those of skill in the are will appreciate that other measurements of circuit performance are possible and within the scope of the inventive subject matter.

The performance indicator for each item on the watch list may be graphically displayed to system operators. The graphical display provides a way for operators to rapidly determine the performance trend for a circuit. For example, different graphical indicators may be used to display the current performance trend for the circuit. If the circuit trend is positive, that is, the circuit is performing acceptably or improving, then the system continues to monitor the circuit for the monitoring period as established above. However, if the circuit trend is negative, that is, the performance of the circuit is degrading, then the system or a system operator can be alerted and take proactive measures to attempt to determine the problem. Such actions may be indicated and taken even before alarm conditions are present in the device or system. This is desirable, because it can allow the system or system operator to detect and correct a problem before it degrades to the point that a customer becomes aware of the problem.

Figure 5:
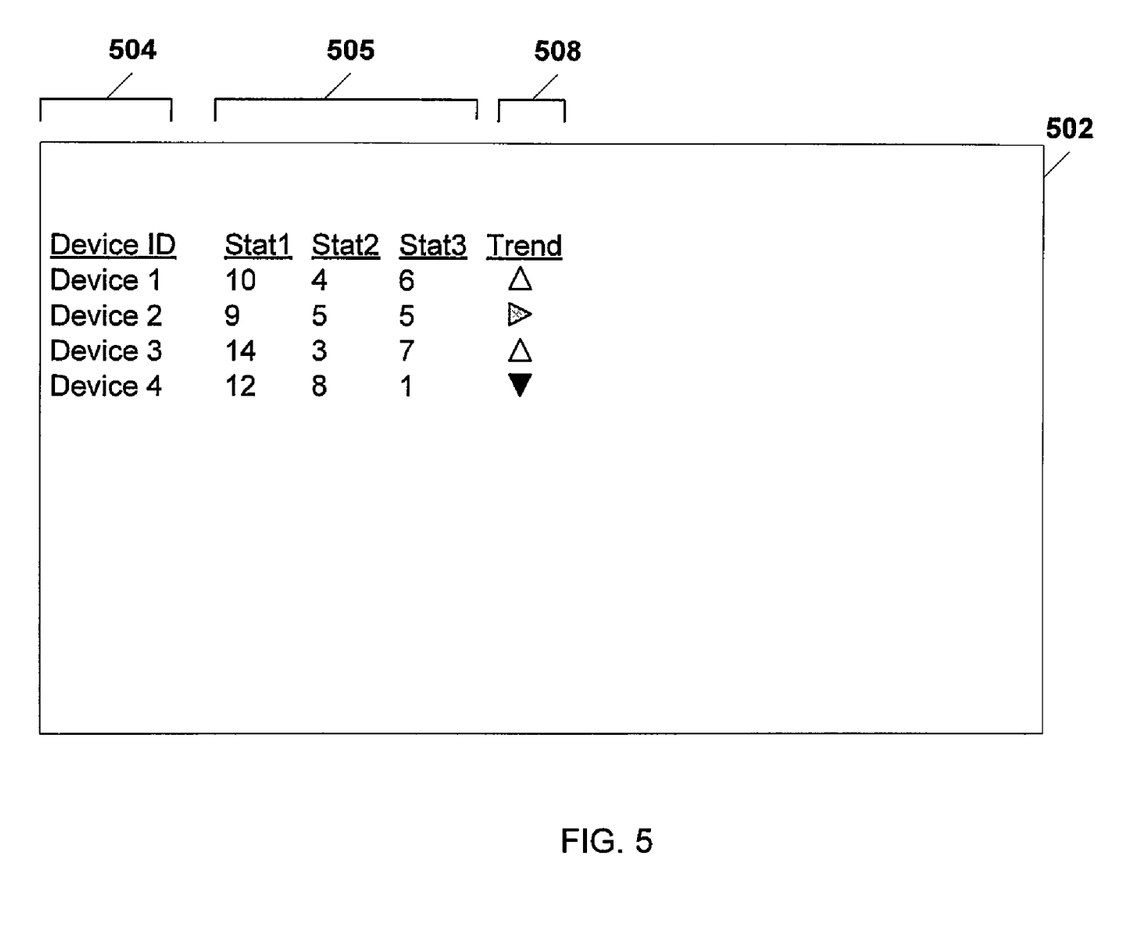
FIG. 5 is a graphical representation of an example user interface according to embodiments of the invention.

FIG. 5 is a graphical representation of an example user interface 502 according to embodiments of the invention. User interface 502 provides a watch list of network equipment and/or circuits including entries created at block 432 in the method described above. The watch list identifies the circuits and equipment (see column 504), provide statistics (see e.g., column 506) and further provides an indicator of the current performance trend (see "Trend" column 508) for the circuit or equipment. In the example shown, an arrow in the "Trend" column provides a graphical view of the performance indicator in a user interface according to an example embodiment of the invention. In the example shown, an arrow is used to indicate the current performance trend for items in the watch list (also referred to as a work list in the example user interface). The arrow may point up for items in the watch list for which the performance trend is improving. The arrow may point down for items in the watch list for which the performance trend is degrading (and which may warrant further action by the system or system operator). The arrow may point to the side for items in which the performance trend is neutral, i.e., neither improving nor degrading. Additionally, the performance trend indicator may be colored or highlighted for items needing attention, such as cases where the performance is degrading.

It should be noted that the user interface illustrated in FIG. 5 is but one example. Other user interface may provide other views, for example, a user interface may provide a view of a single circuit on the watch list. This view can incorporate the graphical performance trend indicator described above.

Figure 6:
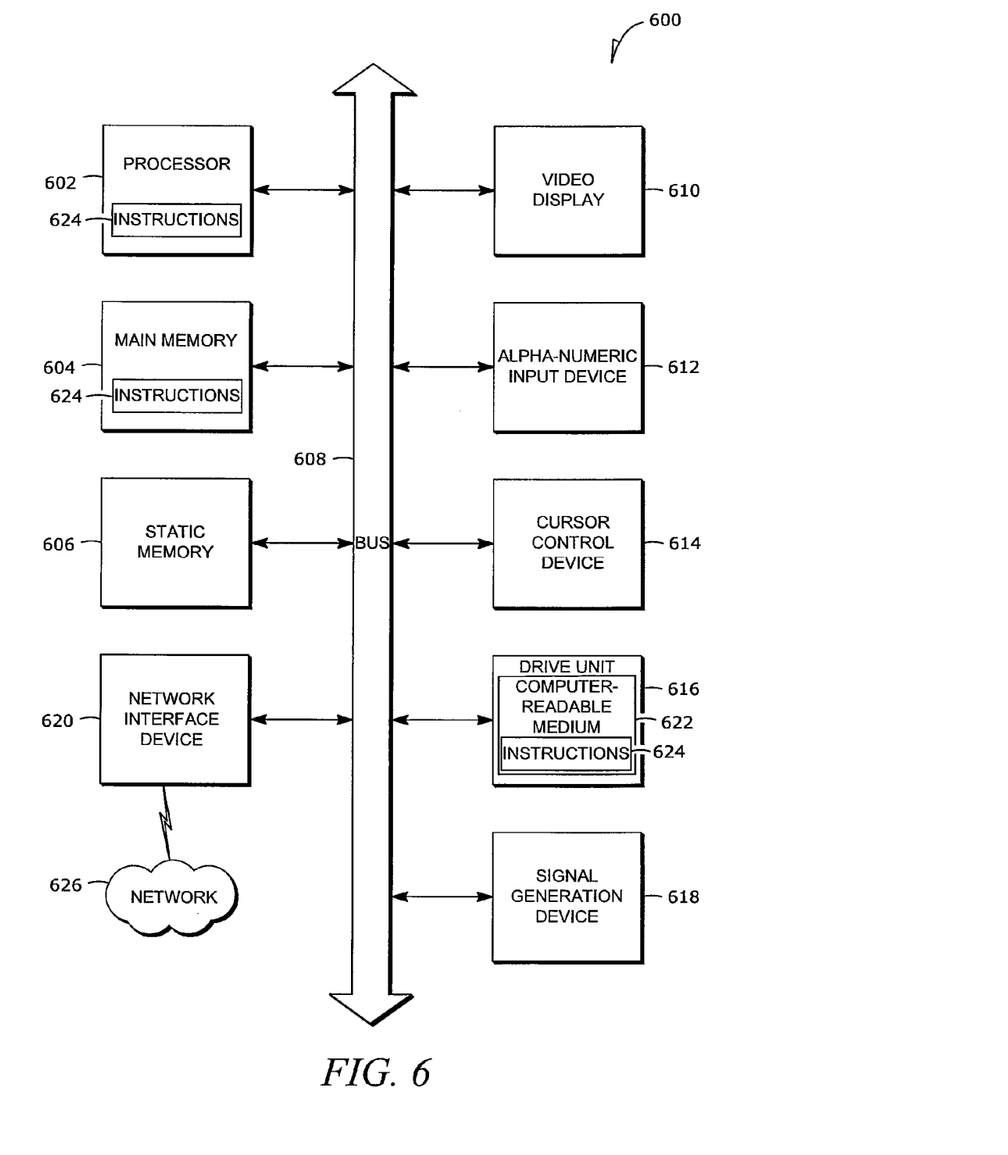
FIG. 6 is a block diagram of a machine in the example form of a computer system within which a set of instructions for causing the machine to perform any one or more of the methodologies discussed herein may be executed.

FIG. 6 shows a block diagram of a machine in the example form of a computer system 600 within which a set of instructions may be executed causing the machine to perform any one or more of the methods, processes, operations, or methodologies discussed herein.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU) a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a drive unit 616, a signal generation device 618 (e.g., a speaker) and a network interface device 620.

The drive unit 616 includes a machine-readable medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical media, and magnetic media.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled.

Although specific embodiments have been illustrated and described herein, it should be appreciated that any arrangement calculated to achieve the same purpose may be substituted for the various embodiments shown. In addition, in the foregoing Detailed Description, it can be seen that various features may be grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the meaning of the claims.

What is claimed is:

1. A method, comprising:
receiving an indication that a first trouble ticket initiated by a first customer has been closed, the first trouble ticket indicating a first resolution for a first problem with a network device;
receiving a second ticket initiated by a second customer indicating a second problem with the network device;
diagnosing, with a processor, the second problem to determine a next action;
determining, with the processor, whether a recurring problem exists for the network device by using a rule set to determine if the first problem is a same problem as the second problem;
upon determining that the recurring problem exists for the network device, determining, with the processor, a monitoring period for the network device based on the first resolution; and
within the monitoring period, monitoring the network device to determine a performance trend for the network device.

2. The method of claim 1, wherein the performance trend indicates that the network device is performing acceptably and wherein the action comprises closing the trouble ticket.

3. The method of claim 1, wherein the performance trend indicates that the network device is performing unacceptably and wherein the action comprises determining a second action to be performed on the network device.

4. The method of claim 1, wherein determining the monitoring period based on the first resolution comprises determining a resolution type for the problem and determining the monitoring period based on the resolution type.

5. The method of claim 1, wherein determining a monitoring period comprises determining a first monitoring period if the first resolution indicates the network device was repaired and determining a second monitoring period if the first resolution indicates that the network device is unstable.

6. The method of claim 5, wherein the first period is shorter than the second period.

7. The method of claim 1, further comprising creating a watch list entry for the network device.

8. The method of claim 7, further comprising displaying the watch list entry and a current value of the performance trend.

9. A tangible machine readable storage medium comprising at least one of a memory, a cache, a server device, a processor, an optical storage disc, an optical storage device, and a magnetic storage device storing instructions which, when executed, cause a machine to at least:
receive an indication that a first trouble ticket initiated by a first end user has been closed, the first trouble ticket indicating a first resolution for a first problem with a network device;
receive a second trouble ticket initiated by a second end user indicating a second problem with the network device;
diagnose the second problem to determine a next action;

determine whether a recurring problem exists for the network device by using a rule set to determine if the first problem is the same as the second problem;

upon determining that the recurring problem exists for the network device, determine a monitoring period for the network device based on the first resolution; and within the monitoring period, monitor the network device to determine a performance trend for the network device.

10. The machine readable medium of claim 9, wherein the performance trend indicates that the network device is performing acceptably and wherein the action comprises closing a trouble ticket associated with the problem.

11. The machine readable medium of claim 9, wherein the performance trend indicates that the network device is performing unacceptably and wherein the action is to be performed on the network device.

12. The machine readable medium of claim 9, wherein the instructions further cause the machine to issue a notification that a trouble ticket has been opened for the problem.

13. The machine readable medium of claim 12, wherein the notification is provided to a customer of a telecommunications provider.

14. The machine readable medium of claim 9, wherein receiving data indicating a problem with a network device includes receiving data from a plurality of network devices.

* * * * *